July 15, 1952  J. M. LESTER ET AL  2,603,747
SWEEP CIRCUIT
Filed April 24, 1944
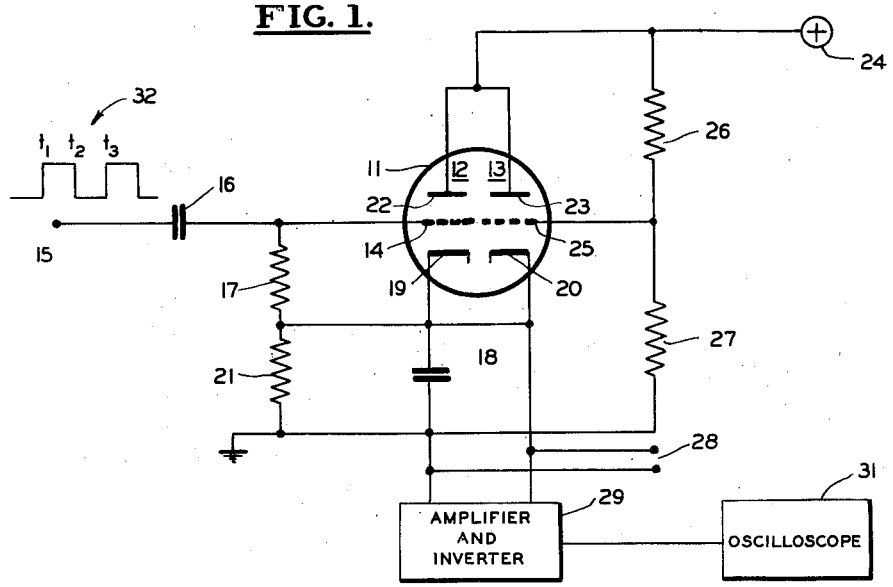
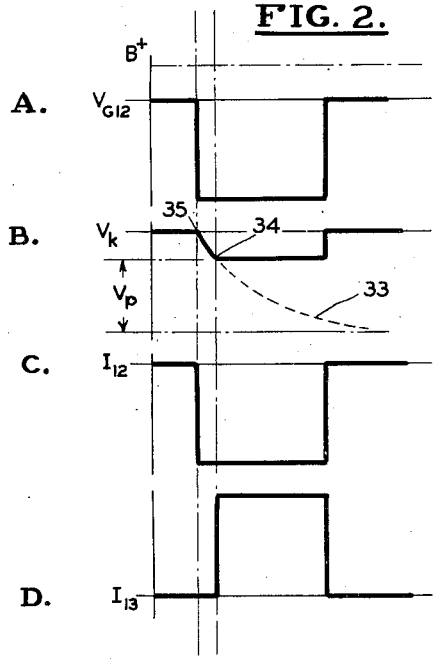
INVENTOR
J. M. LESTER
J. R. WILKERSON
BY
ATTORNEY Patented July 15, 1952

2,603,747

UNITED STATES PATENT OFFICE 2,603,747

SWEEP CIRCUIT

John M. Lester, Rockville Centre, and Jefferson R. Wilkerson, Bayside, N. Y., assignors to The Sperry Corporation, a corporation of Delaware Application April 24, 1944, Serial No. 532,502

5 Claims. (Cl. 250—27)

This invention relates to electronic circuits generally, and is particularly concerned with sweep voltage generating apparatus for oscilloscopes.

The principal object of the present invention is to provide a circuit which will produce a substantially linear sweep voltage of short duration from a square voltage wave with a minimum number of circuit elements. Other objects and advantages of the invention will become apparent as the description proceeds.

In its preferred form, the invention provides a plurality of electronic discharge devices which are connected to control the charging and discharging of a capacitive element for the generation of a sweep voltage. One of the discharge devices operates to effect the charging of the capacitive element and to institute its discharge. The second device is connected to interrupt the discharge of the capacitive element at a time when the rate of discharge is still essentially linear, and this linear portion of the exponential discharge of the capacitive element is taken from across the element as the desired sweep voltage.

A more comprehensive understanding of the invention will be afforded from the following detailed description when considered in connection with the accompanying drawing, in which Fig. 1 is a schematic circuit diagram of an embodiment of the invention; and Fig. 2 is a graph of various electrode voltages and currents developed within the circuit illustrated in Fig. 1.

In the form illustrated in Fig. 1, the invention provides an electronic discharge device 11, having dual elements 12 and 13, each of which may be considered as a single triode. Grid 14 of element 12 is connected to receive a square wave from input terminal 15 through long time constant grid-leak coupling elements comprising a capacitor 16 and a resistor 17. A capacitive element 18 is connected in the lead of cathode 19 of element 12, which has in parallel therewith a resistor 21. Both of the anode electrodes 22 and 23 receive positive energy from source 24 and bias is supplied to grid 25 of element 13 by means of a voltage divider consisting of the resistors 26 and 27. The output of the circuit is taken across the capacitance 18 and delivered to output terminals 28, or may be delivered to an amplifying and inverter device 29 from which it is delivered to the deflecting elements of an oscilloscope 31.

When the square wave 32 reaches grid 14 and at time $t_1$, the grid 14 is driven positive and condenser 16 is charged to a negative value with respect to cathode 19. At time $t_2$ the grid is driven negatively and element 12 is cut off. During the time interval $t_1$—$t_2$, condenser 18 has been charged and when element 12 becomes non-conducting, condenser 18 discharges through resistor 21. The discharge from condenser 18 drives cathode 20 of element 13 more negatively with respect to its grid 25 until this element becomes conducting, thus preventing condenser 18 from discharging any further. Condenser 18 remains at this voltage level until time $t_3$ when the square input wave again drives grid 14 of element 12 positively and the cycle is repeated. In this manner, the discharge is interrupted at a time when it is taking place at a substantially linear rate, and this portion of the output of capacitive element 18 is delivered to the output terminals 28 as the sweep voltage, the slope of which is controlled by the time constant of the R. C. network 21 and 18. The amplitude of the sweep is determined by the selection of the biasing elements 26 and 27 which determine the amount of bias applied to grid 25 of element 13 and thereby control the level at which element 13 becomes conducting to interrupt the discharge of capacitive element 18.

The operation of the circuit may be more clearly visualized with the aid of Fig. 2 in which the wave form A represents the grid voltage of element 12, B the cathode voltage of both elements 12 and 13, and C and D, the respective currents of elements 12 and 13. At time $t_1$ (Fig. 1), the grid voltage of the element 12 is seen to be less than the B+ level of source 24 and remains so during the time when the element is conducting, and also when capacitive element 18 is being charged. At time $t_2$, the tube is cutoff and the grid voltage is seen to fall. Simultaneously, capacitive element 18 starts to discharge through the resistive element 21 and the cathodes of both elements are seen to decrease as illustrated at B between point 35 and point 34. The cathode voltage continues to decrease to the point 34 on the exponential curve 33 at which point the potential difference between cathode 20 of element 13 and grid 25 becomes insufficient to retain element 13 non-conducting, and hence element 13 passes current, maintaining condenser 18 charged to potential $V_p$. That portion of the discharge voltage wave lying between the points 34 and 35 on curve 33 accomplishes the range sweep action desired in oscilloscope 31.

With reference to current curves C and D, it will be noted that current to element 12 falls at time $t_2$, whereas element 13 remains non-conducting until its cathode reaches a certain potential level ($V_p$) under the influence of the discharge of capacitive element 18 to render the tube conducting, whereupon the current rises as shown in Fig. 2D.

As previously stated, the slope of the sweep output wave portion 35—34 is determined by the time constant $R_{21}C_{18}$. The output sweep wave amplitude will always be less than the input square wave amplitude, and since the slope of the sweep wave is that of the voltage decay in condenser 18, it is advisable to adjust the values of the resistors 26 and 27 so that the output amplitude is approximately one-half or less of the input amplitude if a fair degree of linearity is to be assured.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a sweep voltage generator circuit, a capacitive element; first and second electron discharge devices each having a cathode, a control electrode and an anode, the cathodes of said first and second devices being connected to said capacitive element; an anode potential source connected in series with said capacitive element between the anodes and the cathodes of said first and second devices for polarizing said anodes positively with respect to said cathodes; circuit means connected to said first device recurrently varying the control electrode potential thereof between two predetermined values producing recurrent variations of current through said first device from said source for recurrently charging said capacitive element to a first voltage value; and means for maintaining the control electrode of said second device at a predetermined potential positive relative to the junction of said capacitive element and said source but negative with respect to said cathodes for determining a second voltage of said capacitive element at which said second device passes a charge-sustaining current from said source.

2. Sweep voltage generating apparatus comprising first and second electronic discharge devices, each having plate, grid and cathode electrodes, input terminal means for applying a square-wave voltage on the grid electrode of said first device through grid-leak coupling means, a capacitive element connected in the cathode lead of said first device having a resistance in parallel therewith, means for interconnecting the cathode leads of both devices, positive energy supply means for the plate electrodes of both devices, means for supplying a positive biasing voltage to the grid electrode of said second device relative to the terminal of said capacitive element opposite its terminal connected to the cathodes of said devices, and output terminal means connected across said capacitive element.

3. In combination, a first electron discharge device having a cathode, an anode and a control grid, a resistor and a capacitor connected in parallel, one junction of the parallel resistor-capacitor combination being connected to the cathode of said first device, power supply means for maintaining the anode of said electron discharge device biased positively with respect to its cathode, said power supply means comprising a voltage source having a negative terminal connected to the junction of said resistor and capacitor opposite from said cathode, means coupled to the grid of said first device for alternately rendering it conductive to charge said capacitor to a first voltage and rendering it nonconductive to permit discharge of said capacitor, and means including a second electron discharge device for arresting the discharge of said capacitor at a predetermined second voltage lower than said first voltage, said second electron discharge device having a cathode, a control grid and an anode, and said last named means including means for maintaining the anode of said second device positive with respect to its cathode, means connecting its cathode in series with said capacitor, and means for maintaining its control grid at a predetermined positive voltage with respect to the junction between said power supply means and said capacitor and resistor less than said first voltage.

4. A sweep voltage generator circuit comprising first and second electron discharge devices each having a cathode, an anode and a control electrode, a capacitor and resistor in shunt connected at one junction to the cathodes of said devices, anode voltage supply means connected between the junction of said capacitor and resistor opposite said cathodes and the anodes of said devices for polarizing their anodes positively with respect to their cathodes, means for biasing the control electrode of said second electron discharge device to a fixed potential intermediate between the potential of the anode of said second discharge device and the negative potential of said supply means, and means supplying high-amplitude square waves between the control electrode and the cathode of said first electron discharge device for rendering said first device alternately conductive and non-conductive.

5. In combination, a pair of electron discharge devices each having an anode, a cathode and a control grid, means connecting the anodes of said devices in parallel and the cathodes of said devices in parallel, a shunt circuit of a resistor and a capacitor, a first junction of said shunt circuit being connected to said cathodes, means for maintaining said anodes at a positive potential above the cathodes, said means including a voltage source connected between the other junction of said shunt combination and said anodes, means coupled to the grid of said first tube for rendering it alternately conductive and non-conductive, said capacitor being charged during the periods of conductivity, and means maintaining the grid of said second device at a predetermined positive potential with respect to the junction of said voltage source and said shunt resistor-capacitor circuit.

JOHN M. LESTER.
JEFFERSON R. WILKERSON.

REFERENCES CITED

The following references are of record in the file of this patent:

UNITED STATES PATENTS

| Number | Name | Date |
| --- | --- | --- |
| 2,113,220 | Power | Apr. 5, 1938 |
| 2,209,436 | White | July 30, 1940 |
| 2,210,523 | Blumlein | Aug. 6, 1940 |
| 2,241,256 | Gould | May 6, 1941 |
| 2,241,619 | Sherman | May 13, 1941 |
| 2,248,975 | Faudell | July 15, 1941 |
| 2,265,848 | Lewis | Dec. 9, 1941 |
| 2,300,189 | Wolff | Oct. 27, 1942 |
| 2,300,632 | Poch | Nov. 3, 1942 |
| 2,345,668 | Hallmark | Apr. 4, 1944 |
| 2,347,008 | Vance | Apr. 18, 1944 |
| 2,350,069 | Schrader et al. | May 30, 1944 |
| 2,355,363 | Christaldi | Aug. 8, 1944 |